United States Patent [19]

Ginger

[11] 4,192,855

[45] Mar. 11, 1980

[54] PROCESS FOR THE SIMULTANEOUS SEPARATION OF SULFUR AND NITROGEN OXIDES FROM A GASEOUS MIXTURE

[75] Inventor: Edward A. Ginger, Northbrook, Ill.

[73] Assignee: UOP Inc., Des Plaines, Ill.

[21] Appl. No.: 894,963

[22] Filed: Apr. 10, 1978

[51] Int. Cl.$^2$ .............................................. B01D 53/34
[52] U.S. Cl. .................................... 423/239; 423/244
[58] Field of Search .................. 423/239, 244, 213.2, 423/351; 252/462

[56] References Cited

U.S. PATENT DOCUMENTS 3,914,390  10/1975  Kudo et al. .......................... 423/351

FOREIGN PATENT DOCUMENTS 1438119  6/1976  United Kingdom ................. 423/239 A
451458   3/1975  U.S.S.R. ................................... 252/462

*Primary Examiner*—G. O. Peters
*Attorney, Agent, or Firm*—James R. Hoatson, Jr.; Robert W. Welch; William H. Page, II

[57] ABSTRACT

An improved process for the simultaneous separation of sulfur and nitrogen oxides from a gaseous mixture containing said oxides and oxygen is disclosed. The gaseous mixture and ammonia are contacted with a solid sulfur oxides acceptor comprising copper, copper oxide, or mixture thereof dispersed on a carrier material in combination with a nitrogen oxides conversion catalyst consisting of a rare earth metal, metal oxide or mixture thereof.

7 Claims, No Drawings

PROCESS FOR THE SIMULTANEOUS SEPARATION OF SULFUR AND NITROGEN OXIDES FROM A GASEOUS MIXTURE

It has become well known that the oxides of sulfur and nitrogen resulting, for example, from the combustion or air oxidation of high sulfur coal or fuel oil, are among the major pollutants of our enviornment. Nitrogen oxides discharged to the atmosphere are considered to be largely responsible for the formation of what has come to be known as smog—a major source of atmospheric pollution. Sulfur oxides, discharged to the atmosphere from all sources, measure in the millions of tons on an annual basis, and the increasingly deleterious effect of said oxides, as well as the nitrogen oxides, with respect to cardiorespiratory disease, eye irritation, and the like, has prompted rather severe legislative action governing the discharge of said pollutants, particularly in the more densely populated areas where the problem is more acute. In particular, it has been recognized that sulfur oxides discharged to the atmosphere as a component of flue gases from industrial furnaces burning high sulfur coal or fuel oil constitute a substantial if not major portion of the total sulfur oxides discharged to the atmosphere.

Sulfur oxides are conveniently separated from an oxygen-containing gas mixture, such as flue gas, on contacting the mixture with a solid acceptor at an elevated temperature. Typically, the solid acceptor comprises a supported copper and/or copper oxide capable of retaining the sulfur oxides as a sulfate. The process can be used to remove sulfur oxides from flue gases so that the latter may be freely discharged to the atmosphere. Since the solid acceptor requires frequent regeneration, the process generally comprises a repeating acceptance-regeneration cycle. During regeneration, the sulfate is decomposed at an elevated temperature in the presence of a reducing gas to yield a regenerated acceptor and a regeneration off-gas of increased sulfur dioxide concentration. This off-gas is useful, for example, in the manufacture of sulfuric acid and elemental sulfur.

It is an object of this invention to present an improvement to said process whereby nitrogen oxides are separated substantially simultaneously with the sulfur oxides from a gaseous mixture comprising said oxides and oxygen.

In one of its broad aspects, this invention embodies a process for the simultaneous separation of oxides of sulfur and nitrogen from a gaseous mixture comprising said oxides and oxygen which comprises contacting said mixture and ammonia with a solid sulfur oxides acceptor at a temperature of from about 150° to about 450° C., said solid acceptor comprising copper, copper oxide or mixture thereof dispersed on a carrier material in combination with a nitrogen oxides conversion catalyst consisting of a rare earth metal, metal oxide, or mixture thereof.

Another embodiment of this invention concerns a process which comprises contacting said gaseous mixture and ammonia with a solid sulfur oxides acceptor at a temperature of from about 150° to about 450° C., said solid acceptor comprising copper, copper oxide, or mixture thereof dispersed on an alumina support or carrier material in combination with a nitrogen oxides conversion catalyst consisting of cerium, cerium oxide or mixture thereof, said alumina having a surface area of at least about 50 $m^2/gm$.

One of the more specific embodiments of this invention relates to a process which comprises contacting said gaseous mixture and ammonia with a solid sulfur oxides acceptor at a temperature of from about 150° to about 450° C., said ammonia being employed in from about a 0.5:1 to about a 2.5:1 mole ratio with the nitrogen oxides content of said gaseous mixture, and said solid acceptor comprising from about 5 to about 15 wt. % copper, copper oxide, or mixture thereof dispersed on a gamma-alumina support or carrier material in combination with a nitrogen oxides conversion catalyst consisting of from about 0.01 to about 2.0 wt. % cerium, cerium oxide, or mixture thereof, and thereafter regenerating said solid acceptor by heating the same in contact with a reducing gas comprising hydrogen and from about 50 to about 90 vol. % steam.

Other objects and embodiments of this invention will become apparent in the following detailed specification.

In the art relating to the separation of sulfur oxides from a gaseous mixture comprising sulfur oxides and oxygen, solid acceptors comprising copper, copper oxide or a mixture thereof are well known. The copper component is most often dispersed on a refractory inorganic oxide carrier material. Refractory inorganic oxides suitable for use include naturally occurring materials, for example, clays and silicates such as fuller's earth, attapulgus clay, feldspar, halloysite, montmorillonite, kaolin, and diatomaceous earth, frequently referred to as siliceous earth, diatomaceous silicate, kieselguhr, and the like, and the naturally occurring material may or may not be activated prior to use by one or more treatments including drying, calcining, steaming and/or acid treatment. Synthetically prepared refractory inorganic oxides like alumina, silica, zirconia, boria, thoria, magnesia, titania, chromia, etc., or composites thereof, particularly alumina in combination with one or more refractory inorganic oxides, for example, alumina-silica, alumina-zirconia, alumina-chromia, and the like, are also suitable. Alumina is a preferred refractory inorganic oxide, and the alumina may be any of the various hydrous aluminum oxides or alumina gels including alpha-alumina monohydrate (boehmite), alpha-alumina trihydrate (gibbsite), beta-alumina trihydrate (bayerite), and the like. Activated aluminas, such as have been thermally treated to eliminate substantially all of the water and/or hydroxyl groups commonly associated therewith, are particularly useful. Preferably, the alumina is an activated alumina with a surface area of from about 50 to about 500 $m^2/gm$., especially gamma-alumina and eta-alumina resulting from the thermal treatment of boehmite alumina and bayerite alumina, respectively, generally at a temperature of from about 400° to about 1000° C. The refractory inorganic oxide may be employed in any suitable shape or form including spheres, pills, extrudates, granules, briquettes, rings, etc. The copper content of the solid acceptor, present as copper and/or copper oxide, but calculated as the elemental metal, is generally in the range of from about 1 to about 25 wt. % depending at least in part on the available surface area of the selected carrier material. The copper component, calculated as the elemental metal, will preferably comprise from about 5 to about 15 wt. % of the solid acceptor.

Pursuant to the present invention, the copper component is dispersed on the selected carrier material in combination with a nitrogen oxides conversion catalyst consisting of a rare earth metal, metal oxide, or mixture thereof. The rare earth metal component of the acceptor, while effecting a substantial improvement in nitrogen oxides conversion, has the further beneficial effect of increasing the capacity of the solid acceptor for sulfur oxides, and also the regeneration efficiency thereof. Rare earth metals for use herein are intended to include cerium, lanthanum, praseodymium, neodymium, illinium, samarium, europium, gadolinium, terbium, dysprosium, holmium, erbium, thulium, scandium, yttrium, lutecium and the like. In any case, the selected rare earth metal, metal oxide or mixture thereof, is suitably employed in an amount comprising from about 0.01 to about 2.0 wt. % of the solid acceptor. Of the rare earth metals, cerium and/or cerium oxide, is preferred.

The solid acceptor herein contemplated may be prepared in any conventional or otherwise convenient manner. It is a preferred practice to impregnate the desired metal component on a preformed support or carrier material from an aqueous solution of a precursor compound of said metal component, the impregnated carrier material being subsequently dried and calcined to form the desired metal component dispersed on the carrier material. Precursor compounds typically include the halides and nitrates decomposable to the desired metal component upon calcination. The metal components are preferably and advantageously impregnated on the selected carrier material from a common impregnating solution thereof.

The solid acceptor of this invention is suitably employed in a fixed bed type of operation utilizing two or more reactors alternating between the acceptance and regeneration phases of the operation to provide a continuous process. The sulfur oxides acceptance phase is usually effected at a temperature of from about 150° to about 450° C. as provided by hot flue gases, a temperature of from about 350° to about 450° C. being preferred. The regeneration phase is carried out at an elevated temperature in the presence of a reducing gas—usually a hydrogen and/or carbon monoxide-containing gas mixture diluted with nitrogen, steam or other suitable diluents. The acceptor is preferably and advantageously regenerated in contact with a reducing gas comprising hydrogen. Regeneration is further advantageously effected in the presence of steam, the regeneration gas preferably comprising from about 50 to about 90 vol. % steam to further inhibit the formation of copper sulfide. Regeneration temperatures may vary over a relatively wide range, but preferably are in the range of from about 350° to about 450° C.

The following examples are presented in illustration of the improvement resulting from the practice of this invention and are not intended as an undue limitation and the generally broad scope of the invention is set out in the appended claims.

EXAMPLE I

In the preparation of a solid acceptor representative of the prior art, 1/16" spheroidal gamma-alumina particles were employed as a carrier material. The spheroidal particles, precalcined in air for 2 hours at about 1000° C., had an average bulk density of about 0.55 gms/cc, an average pore volume of about 0.31 cc per gm., an average pore diameter of about 129 Angstroms, and a surface area of about 96 m²/gms. 300 gms. of the spheroidal alumina particles were immersed in an impregnating solution of 60.78 gms. of copper nitrate trihydrate dissolved in 400 ml. of water. The alumina spheres were tumbled in the solution at ambient temperature conditions for about ½ hour utilizing a steam-jacketed rotary dryer. Steam was thereafter applied to the dryer jacket and the solution evaporated to dryness in contact with the tumbling spheres. The impregnated spheres were then calcined in air for 2 hours at about 535° C. to yield a solid acceptor containing 5 wt. % copper. This solid acceptor is hereinafter referred to as Acceptor I.

EXAMPLE II

In this example, representing one preferred embodiment of this invention, 1/16" spheroidal gamma-alumina particles, substantially as described in Example I, were utilized as a carrier material. The spheroidal particles, percalcined in air at about 1000° C. for 2 hours, had an average bulk density of about 0.55 gms/cc, an average pore volume of about 0.27 cc/gm., an average pore diameter of about 120 Angstroms, and a surface area of about 90 m²/gm. 65 gms. of the spheroidal particles were immersed in an impregnating solution contained in a steam-jacketed rotary dryer and prepared by dissolving 13.21 gms. of copper nitrate trihydrate and 5.09 gms. of Ceric Ammonium Nitrate in 100 ml. of water. The spheres were tumbled in the solution at ambient temperature conditions for about ½ hour. Steam was thereafter applied to the dryer jacket and the solution evaporated to dryness in contact with the tumbling spheres. The impregnated spheres were then calcined in air for about 1 hour at 535° C. to yield a solid acceptor containing about 5 wt. % copper and about 2 wt. % cerium. The solid acceptor of this example is hereinafter referred to as Acceptor II.

A comparative evaluation of the described solid acceptors were effected. 50 cc of the acceptor was in each case disposed as a fixed bed in a vertical tubular reactor with a ⅞" inside diameter. The acceptors were first evaluated with respect to a gaseous mixture comprising about 0.2 vol. % sulfur dioxide, 0.075 vol. % nitrogen oxides, 3 vol. % oxygen, 15 vol. % steam, 0.075 vol. % ammonia and about 81.6 vol. % nitrogen. The acceptors were then further evaluated with respect to a gaseous mixture differing from the first only in the ammonia content—the ammonia comprising 0.1125 vol. % of the mixture in the latter case. The acceptor of Example I evaluated with respect to the first mentioned gaseous mixture is hereinafter referred to as Acceptor Ia, and the acceptor of Example I evaluated with respect to the last mentioned gaseous mixture is hereinafter referred to as Acceptor Ib. Similarly, the acceptor of Example II is hereinafter referred to as Acceptor IIa and Acceptor IIb.

The gaseous mixture was in each case preheated to 400° C. and charged upflow through the acceptor bed at a gaseous hourly space velocity (GHSV) of about 11,000. The reactor effluent was analyzed and discharged to the atmosphere through a wet test meter. After one hour, the solid acceptor was regenerated. Regeneration was by preheating a reducing gas to 400° C. and charging the reducing gas upwardly through the acceptor bed for 20 minutes at a gaseous hourly space velocity of 1,000. Each of the acceptors was regenerated utilizing hydrogen, the hydrogen being employed in a 1:4 mole ratio with steam. Again, the reactor effluent was analyzed and discharged to the atmosphere through a wet test meter. The solid acceptors were evaluated over about 8 acceptance-regeneration cycles. The average acceptance efficiency per acceptance cycle was determined, the acceptance efficiency being the actual capacity of the acceptor for sulfur oxides as a percentage of the sulfur oxides charged to the acceptor bed. The average regeneration efficiency per regeneration cycle was likewise determined after about 8 cycles, the regeneration efficiency being the percent of available copper reduced to the elemental metal during the regeneration cycle. The sulfur oxides acceptance efficiency, nitrogen oxides conversion efficiency, and the regeneration efficiencies are tabulated below.

| Acceptor | Efficiency | | |
|---|---|---|---|
| | $NO_x$ Conversion | $SO_2$ Acceptance | Regeneration |
| Ia | 53 | 76 | 83 |
| Ib | 77 | 76 | 83 |
| IIa | 62 | 85 | 89 |
| IIb | 94 | 85 | 89 |

The tabulated data clearly demonstrates the improved sulfur oxides acceptance efficiency as well as the nitrogen oxides conversion efficiency of the acceptor of this invention (Acceptors IIa and IIb), especially at the higher ammonia concentrations (Acceptor IIb). Further, each of the acceptors, IIa and IIb, exhibit an improved regeneration efficiency.

I claim as my invention:

1. A process for the simultaneous separation of oxides of sulfur and nitrogen from a gaseous mixture containing said oxides and oxygen which comprises contacting said mixture and ammonia with a solid sulfur oxides acceptor at a temperature of from about 150° to about 450° C., said solid acceptor comprising copper, copper oxide, or a mixture thereof dispersed on a carrier material in combination with a nitrogen oxides conversion catalyst consisting of cerium metal, cerium oxide, or a mixture thereof, said nitrogen oxides conversion catalyst being present in the range of from about 0.01 to about 2.0 wt. % of said solid sulfur oxides acceptor.

2. The process of claim 1 further characterized in that said copper, copper oxide, or mixture thereof comprises from about 5 to about 15 wt. % of said solid acceptor.

3. The process of claim 1 further characterized in that said carrier material is an alumina with a surface area of at least about 50 $m^2/gm$.

4. The process of claim 1 further characterized in that said carrier material is gamma-alumina.

5. The process of claim 1 further characterized in that said carrier material is eta-alumina.

6. The process of claim 1 further characterized in that said ammonia is employed in from about a 0.1:1 to about a 2.5:1 mole ratio with the nitrogen oxides content of said gaseous mixture.

7. The process of claim 1 further characterized in that said solid acceptor is regenerated by heating the same in contact with a reducing gas comprising hydrogen and from about 50 to about 90 vol. % steam.

* * * * *